United States Patent [19]

Ohnesorge et al.

[11] 4,422,335

[45] Dec. 27, 1983

[54] PRESSURE TRANSDUCER

[75] Inventors: David H. Ohnesorge; Frank J. Antonazzi, both of South Bend, Ind.

[73] Assignee: The Bendix Corporation, Southfield, Mich.

[21] Appl. No.: 247,482

[22] Filed: Mar. 25, 1981

[51] Int. Cl.$^3$ .............................................. G01L 9/12
[52] U.S. Cl. ..................................... 73/724; 73/701; 73/708; 361/283
[58] Field of Search ................. 361/283; 73/724, 718, 73/708

[56] References Cited

U.S. PATENT DOCUMENTS

| | | | |
|---|---|---|---|
| 4,064,550 | 12/1977 | Dias et al. | 73/724 |
| 4,152,748 | 5/1979 | Arkans | 361/283 |
| 4,175,428 | 11/1979 | Eilersen | 361/283 X |
| 4,227,419 | 10/1980 | Park | 73/724 |
| 4,322,977 | 4/1982 | Sell et al. | 73/724 X |

FOREIGN PATENT DOCUMENTS 18282 4/1979 European Pat. Off. .
2172802 2/1972 France .

Primary Examiner—S. Clement Swisher
Assistant Examiner—John E. Chapman
Attorney, Agent, or Firm—Ken C. Decker; William A. Marvin

[57] ABSTRACT

A pressure transducer (26) is disclosed. A multiplicity of signal plates (Cs, Cr, Csf, Crf) are disposed on a first quartz disc (88). Opposing the signal plates (Cs, Cr, Csf, Crf) across a gap formed by an annular frit (92) is a common plate (94) disposed on a second quartz disc (86). The signal plates (Cs, Cr, Csf, Crf) and common plate (94) form capacitors which are operable to modulate alternating excitation signals applied to the signal plates. The capacitances vary the modulation during deflections of the discs (86, 88) as a result of pressure changes, and the common plate (94) algebraically sums the modulated excitation signals into a single output from the transducer (26).

14 Claims, 11 Drawing Figures

PRESSURE TRANSDUCER

The invention pertains generally to a pressure transducer and is more particularly directed to a pressure transducer of the quartz capacitive type.

Quartz capacitive pressure transducers are conventionally known in the art for the advantageous measuring of an unknown pressure. The general form for these transducers includes at least one flexible diaphragm formed of a vitreous material such as quartz with a capacitor plate disposed thereon. Opposing the first capacitor plate and separated by a gap therebetween is a second capacitor plate that is disposed on either a stationary quartz base or another quartz diaphragm member. Usually, the opposing members are separated by an annular frit and the resulting chamber evacuated. The flexible diaphragm is exposed to a difference in pressures which cause a mechanical deflection proportional to the difference. When the diaphragm deflects, the gap distance will vary accordingly and thus change the capacitance value between the two plates. Therefore, the capacitance value of the transducer changes proportionally to the variances in pressure and is a measure thereof.

When the capacitance is excited with a carrier frequency, a modulation is induced when the capacitance varies to change some electrical characterisitic of the excitation. The induced changes on the excitation can thereafter by processed by electrical circuitry to yield an electrical signal representative of the pressure measured. The combination of the capacitive transducer and an electrical processing provides a facile technique for generating pressure measurements.

The inherent sensitivity of these transducers is related to the magnitude of capacitance variation with respect to variation in pressure. Quartz is preferred for the diaphragm material because its mechanical hysteresis in flexure is extremely low. The hysteresis exhibited by quartz is at least two orders of magnitude smaller than that available from the best steel. This deflection repeatability permits the pressure measurements of the transducer to be accurate without drift and creep. Combined with its deflection characterisitic, a quartz diaphragm has a substantial temperature insensitivity that improves reliability of the measurement. In addition to sensitivity and temperature stability, the quartz diaphragm also lends mechanical ruggedness and contamination resistance to these transducers.

One particularly advantageous absolute pressure measuring system which uses a dual configuration of quartz capacitive pressure transducers is described in U.S. Ser. No. 153,129, now U.S. Pat. No. 4,332,977, entitled: "Pressure Measuring System" filed on May 27, 1980, in the name of Robert C. Sell, John R. Sheler, and John M. Juhasz. The disclosure of Sell et al. is hereby incorporated by reference herein.

The referenced application discloses a highly accurate pressure measuring system which incorporates a closed loop system and yields a digital output. The previously developed system comprises a pressure sensitive capacitor and a stable reference capacitor contained within a first quartz capacitive sensing transducer. The pressure sensitive capacitor and reference capacitor are excited by sinusoidal signals 180° out of phase with each other. The outputs of the capsule are connected to a summing junction thereby producing a sensing signal which is proportional to changes in the measured pressure. The summing junction output is used to excite a second quartz capacitive feedback transducer connected in a negative feedback loop to another input of the summing junction. The feedback transducer also contains a pressure sensitive capacitor and a reference capacitor excited 180° out of phase with each other by a feedback signal. The output current from the feedback transducer is utilized to null or balance the sensing signal and is thus a measure of the pressure sensed when the summing junction output is zero.

Additionally, the system loop includes a digital integrator means or counter for the direct measurement of the number of the discrete increments of feedback signal necessary to null the output of the summing junction. The digital readout of the counter is thereby directly related to the desired pressure measurement.

Since in the steady state condition, the system loop can be considered as having an infinite gain, the transfer function of the system is substantially equivalent to the ratio of the difference of the capacitances of the sensing transducer to the difference of the capacitances of the feedback transducer multiplied by the maximum digital count. This ratio varies when pressure variances change the pressure sensitive capacitances in both the sensing transducer and the feedback transducer. The manner in which these values vary in both the numerator and denominator determines the pressure (P) versus digital number (N) characteristic of the measuring system.

It is taught in Sell et al. that an advantageous output function for the system could be implemented by compressing more of the digital count at the lower pressure values than at higher values. Advantageously, this meant that a digital word with fewer bits could be used for the same accuracy over the entire pressure range. This was accomplished in one particular embodiment of Sell et al. by utilizing the feedback transducer to provide variable increments of feedback current with respect to pressure. Smaller increments were used at lower pressures and larger increments at higher pressures thereby adding to the resolution at the low end of the scale.

However, to obtain the correct pressure versus digital number output characteristic for this system, the two separate quartz transducers must be chosen so that each pressure sensitive capacitor and reference capacitor varies in a correct relationship to each other. Ideally, the slopes of the transducers should be identical. It was found that to produce accuracies of 1% of point over a 100-to-1 pressure range the plate separation differences between the two transducers have to be matched extremely closely. Further, the diaphragm or plate thickness and frit placement as measured from the diaphragm center had to vary in the correct manner. This is because all of these variables change the slope of the pressure versus capacitance curves for the transducers. Since all of the variables are production variables which can change from transducer to transducer during manufacture, it is extremely difficult to maintain these variables within the necessary range of tolerances for the desired accuracies.

Therefore, until the present invention, the method used to provide the necessary accuracies for the system was to manufacture transducers to reasonable production standards and thereafter sort the transducers by their actual pressure vs. capacitance characteristics. Once the individual transducer characterisitics were recorded, a matching process was initiated to pair together those transducers which were close enough in characterisitics.

This method is more time consuming than necessary and relatively expensive. Moreover, a substantial number of the transducers are wasted from any production run since statistically it can be shown that while all of the transducers may be within production tolerances, there will be a certain number which are still unable to be matched to a corresponding transducer.

Moreover, in the referenced prior art measuring system the summation of alternating output signals of four capacitors was required. This was accomplished by soldering the wire leads from the individual capacitors together at an electrical node. This combination of signals, external to the transducer, is more noise and interference susceptible than necessary. Therefore, it would be highly desirable to combine the alternating signals of the system internal to the transducer so as to alleviate the problem.

SUMMARY OF THE INVENTION

The invention provides a quartz capacitive transducer characterized by at least one common plate disposed on one of the quartz substrates for forming capacitors with a multiplicity of signal plates disposed on the other quartz substrate.

The transducer thus includes a multiplicity of capacitors formed between the quartz substrates which have a common plate. The common plate provides a means for algebraically summing all of the signals input to the opposing signal plates together. The summation process is internal to the transducer and much less susceptible to noise.

In a preferred embodiment, the number of capacitors formed on the transducer is four. Two pressure sensitive capacitors and two relatively pressure insensitive reference capacitors are provided to allow the direct substitution of a single transducer for the two transducers used in the referenced measuring system.

The production of a quartz capacitive transducer in this manner reduces the number of quartz diaphragms and deposition processes necessary to provide the four capacitors necessary for the high resolution pressure measuring system of Sell et al. Since only one transducer must be manufactured instead of two, production and material costs are reduced. Size and weight of the final measuring system is also reduced.

More importantly, the production variables that change the slope of the pressure versus capacitance curves for this type of transducer are perfectly matched. No longer does the plate separation, frit radius, and diaphragm thickness need to be matched between two transducers. Now all four signal plates are disposed on the same quartz disc facing a common plate on the opposing quartz disc and these variables are perfectly matched, i.e., they are identical. This elimination of production variables from the pressure versus capacitance curves of the transducer obviates the need for the expensive matching technique used previously for the dual transducer configuration.

Still further, because the common plate combines all of the signals internally to the transducer into one ouput or error signal, there is less likelihood of interference or noise producing distortion in the pressure measuring system. Moreover, in the single transducer configuration, the transducer lends itself more readily to internal and external shielding. An external ground shield is provided around the transducer to produce the external shielding while internally a common conductive separator shields the signal capacitor plates.

Additionally, by providing the capacitor plates on one surface the trimming of not only each capacitor to the correct value, but also that of the ratio necessitated for the Sell et al. application can be accomplished in a more facile manner. In a calibration step a laser can be used after the transducer is assembled to produce the desired characteristic. This eliminates the tedious zero and span adjustments that must be made for other transducers.

These and other objects, features, and aspects of the invention will be more clearly understood and better described if a reading of the detailed description is undertaken in conjunction with the appended drawings wherein:

DETAILED DESCRIPTION

Figure 1:
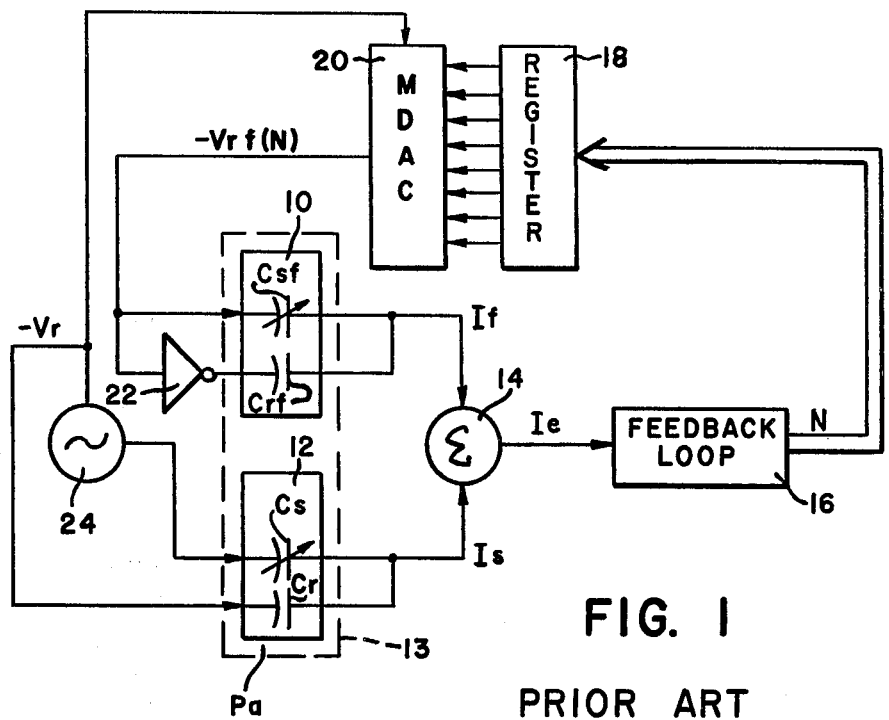
FIG. 1 is a system block diagram view of a prior art pressure measuring system utilizing a dual quartz capacitive transducer configuration.

Illustrated in FIG. 1 is the prior art pressure measuring system of Sell et al. which includes a quartz capacitive sensing transducer 10 and a quartz capacitive feedback transducer 12. The dual transducer configuration is more fully described in the Sell et al. application. Each of the transducers 10, 12 contain a pressure sensitive capacitor Cs, Csf and a relatively pressure insensitive capacitor Cr, Crf, respectively. The sensing transducer 12 is fed by an alternating signal generator 24 in phase and out of phase by signals Vr, −Vr to produce a current Is which is proportional to the pressure Pa in chamber 13. The current Is is summed with a feedback current If to produce an error current Ie in a summing junction 14. This error current is operated on by a system loop 16 which produces a digital number N. The digital number N is fed back to a register 18. The register 18 transmits the digital number N to a multiplying digital to analog converter (MDAC) 20. The MDAC further receives the inverted excitation signal $-Vr$ and generates the signal $-Vr\ f(N)$. The output of the MDAC is an alternating signal of phase $-Vr$ whose amplitude is a function of the digital number N. The output of the MDAC is subsequently fed in phase to Csf and out of phase to Crf via an inverting amplifier 22. The outputs of the feedback capacitors are summed to output a differential current which is the feedback current If.

In the referenced Sell et al. application it is taught that the error current Ie is used to incrementally change the N number to cause the balancing of the feedback current If and pressure sensitive current Is. This nulling of the error current Ie will then produce a final digital number N which is a measure of the pressure in the chamber 13. Moreover, making the feedback current If a function of the pressure by using the quartz capacitive transducer 10, it is known that a compression of the digital numbers N will occur at lower pressures. This allows a more advantageous system whereby fewer bits need to be used for the same accuracy of the pressure measurements and whereby the slew rates of the system are better controlled.

Figure 2:
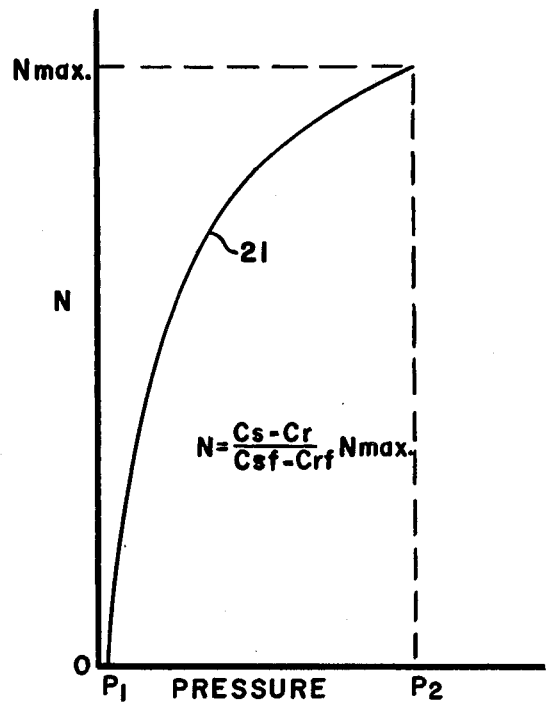
FIG. 2 is a graphical representation of the digital output number N as a function of pressure P for the pressure measuring system illustrated in FIG. 1.

The desired characteristic response of the system illustrated in FIG. 1 is graphically represented in FIG. 2, where the digital number N is shown as a function of pressure P. From inspection it can be seen that there is a greater change in digital number N for incremental changes in pressure at lower pressure values than at higher pressure values. The slope dN/dP is initially large and thereafter gradually decreases as the pressure approaches the maximum measured pressure, P2. This provides the increased resolution at lower pressure values because of the compression of the digital numbers at the low end of the pressure scale.

The invention performs the function of the transducer 10 and transducer 12 by providing a single quartz capacitive transducer containing four capacitors similar to Cs, Cr, Csf, and Crf. The four capacitors are formed such that if connected identically to those shown in FIG. 1, then the N versus P characteristic of the system will be substantially commensurate to that illustrated in FIG. 2.

Figure 3:
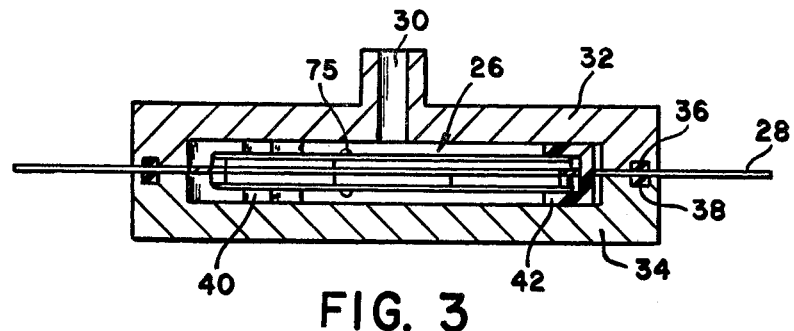
FIG. 3 is a sectional side view of a mounting structure for a quartz capacitive transducer constructed in accordance with the invention.
Figure 4:
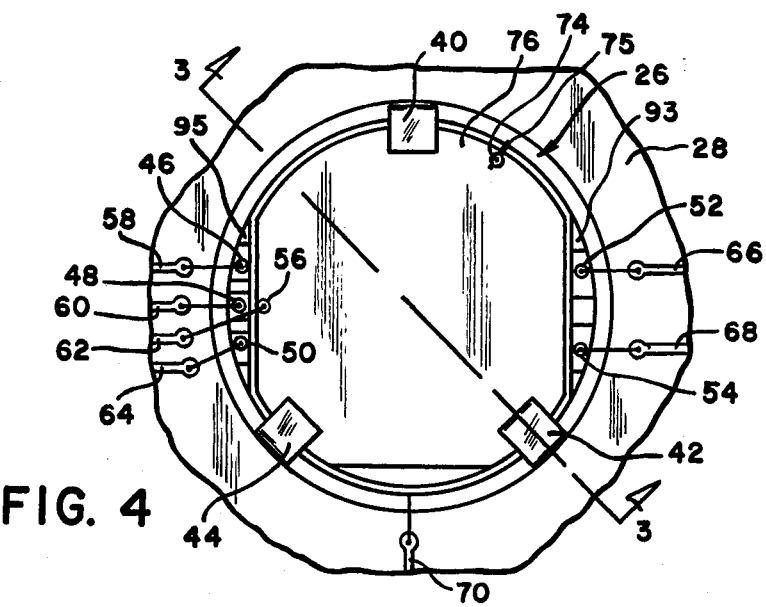
FIG. 4 is a top view, with a casing member removed, of the mounting structure for the quartz capacitive transducer illustrated in FIG. 3.
Figure 5:
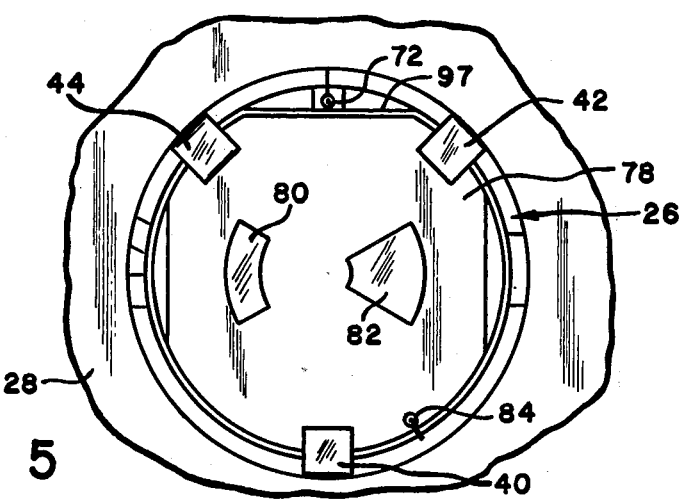
FIG. 5 is a bottom view, with a casing member removed, of a mounting structure for the quartz capacitive transducer illustrated in FIGS. 3 and 4.

This transducer is shown as element 26 in FIGS. 3, 4, and 5 where a technique for mounting the capsule-shaped transducer in a pressurized environment is illustrated. In these Figures a common printed circuit board 28 is shown which has a generally circular aperture cut out to provide a mounting space for the transducer 26. Forming a sealed pressure chamber around the transducer and aperture are two opposing cup-shaped casing members 32 and 34. The upper casing member 32 has a port 30 for connection to the source of pressure that is to be measured. The port 30 can communicate with the pressure source by any suitable conduit means.

The transducer 26 is mounted within the enclosed chamber by three generally C-shaped retainer clamps 40, 42, and 44. The retainer clamps which are equal angularly spaced on the transducer 26 are preferably formed of an elastomeric material. Clamps 40, 42, 44 hold the capsule 26 under slight compression in their central mounting channels when casing members 32, 36 are assembled. The transducer floats in these retainer clamps and is exposed to the pressure within the enclosed chamber. A fluidic seal for the pressure chamber is maintained around the periphery of the casing members 32, 34 by O-rings 36, 38 fitted into annular slots cut in the casing members.

Figure 6:
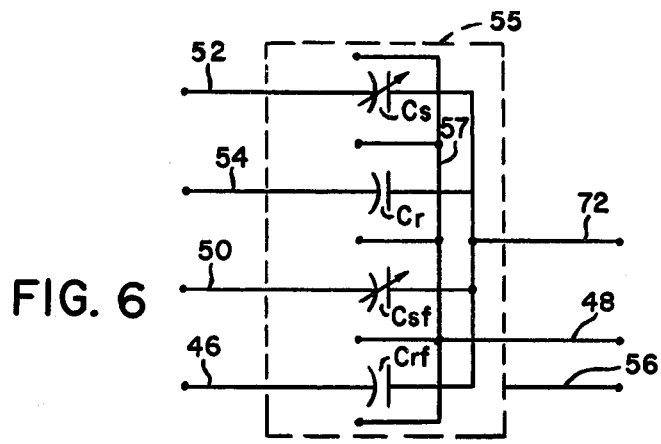
FIG. 6 is a detailed electrical schematic view of the quartz capacitive transducer illustrated in FIGS. 3, 4, and 5.

Connecting a processing circuit (not shown) of the circuit board 28 to the transducer 26 are transducer terminals 46, 48, 50, 52, 54, 56, and 72. These transducer terminals are connected to terminal strips 58, 60, 64, 66, 68, 62 and 70, respectively, by soldering jumper wires between the two. Cutouts 93, 95, and 97 are provided on the quartz discs to permit connection to the terminals. The processing circuit is preferably the pressure measuring system as shown in FIG. 1. A detailed electrical schematic of the transducer 26, shown in FIG. 6 illustrates it contains a pressure sensitive sensing capacitor Cs, a relatively pressure insensitive reference capacitor Cr, a pressure sensitive feedback capacitor Csf, and a relatively pressure insensitive feedback reference capacitor Crf.

The schematic illustrates that the terminals 46, 50, 52, and 54 are electrically connected to separate or signal capacitor plates while terminal 72 is electrically connected to one common capacitor plate. Input signals to the terminals 46, 50, 52, and 54 will be modulated by the change in capacitances between the signal plates and the common plate. An algebraic summation in the common plates will combine the modulated input signals to generate one output signal via terminal 72.

It is readily seen that the transducer 26 may be used to take the place of the pressure transducer 10, pressure transducer 12, and the summing junction 14 in the system of the first Figure. Thus, the input terminals 52 and 54 would be fed by the alternating generator 24 with excitation signals Vr and $-Vr$, respectively. Similarly, transducer input terminals 50 and 46 would be fed by the output of the MDAC 20 and its inversion via inverting 22. Output terminal 72 which is connected to the common plate for all four capacitors receives the sum of the four oscillating currents and will output the error current Ie. The single transducer 26 is thus electrically equivalent to the two transducers illustrated in the first Figure.

Additionally, the transducer 26 is provided with an external ground shield 55 (shown schematically in FIG. 6) which connects to the transducer terminal 56. The external ground shield 55 is for the purpose of shunting to ground stray electromagnetic radiation and interference from outside the transducer. Likewise, an internal ground shield 57 (shown schematically in FIG. 6) is provided between the capacitor plates and connects to the transducer lead 48. Since all four capacitors are contained within the transducer and excited by oscillating voltages some intercapacitance interference is bound to take place. The internal ground shield 57 intercepts this unwanted self-interference and shunts it to ground. Terminals 48 and 56 are therefore connected in the pressure measuring circuit to either signal ground or chassis ground.

Returning for a moment to FIGS. 4 and 5, the external ground shield 55 comprises a conductive pattern vapor deposited or screened on the top and bottom of the transducer 26. The pattern for the ground shield that is placed on the top of the transducer is shown as 76 in FIG. 4 and the pattern placed on the bottom of the transducer is shown as 78 in FIG. 5. Pattern 76 essentially covers the top of the transducer 26 and is electrically connected to the terminal 56 by a solder joint. Basically, the same shape of pattern 78 is screened or vapor deposited on the reverse side of the transducer except for a pair of arcuate windows 80 and 82. The arcuate windows are to allow optically transparent openings through the quartz disc to permit laser trimming of the signal plates within the transducer. The windows 80 and 82 may be of any shape desired, but that illustrated is preferred for the particular embodiment shown in the drawings. The conductive pattern 76 and pattern 78 are electrically connected together by a wire jumper 75 connecting solder point 74 to solder point 84. The external ground shield substantially surrounds the outside of the transducer in a conductive pattern to shield it from interference and noise.

Figure 7:
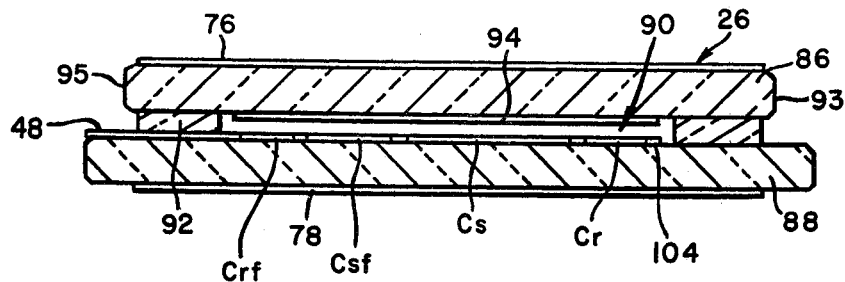
FIG. 7 is a cross-sectional side view of the quartz capacitive transducer illustrated in FIGS. 3, 4, and 5.

FIG. 7 illustrates a cross section of the transducer 26 wherein the layering of the device is clearly shown. The first layer comprises the conductive pattern 76 for the external shield which is supported by an insulative quartz substrate 86 in the shape of a disc. A common electrode 94 has been plated on the inner surface of the disc 86. Cutouts 93 and 95 are provided for easy access to the transducer terminals. Similarly, a quartz disc 88 has an electrode 90 segmented into four capacitor signal plates disposed on its inner surface and the conductive pattern 78 plated on its outer surface. The two electrodes 90 and 94 oppose each other across a separation to form the four capacitors of the device. An annular frit 92 provides a separation or gap and a means for sealing the transducer 26 to a reference pressure. Generally, for accuracy it is desirable for the chamber formed by the frit to be evacuated to a substantial vacuum. Preferably, the frit is a vitreous material which has temperature expansion properties similar to the quartz discs.

Figure 8:
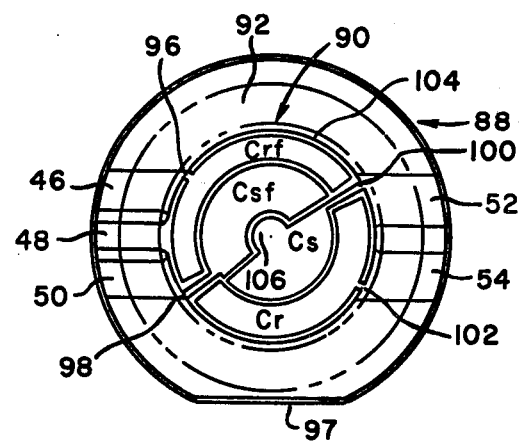
FIG. 8 is a top view of the quartz capacitive transducer illustrated in FIG. 7, with the top quartz disc removed.

In FIG. 8 the electrode 90 is shown segmented into four separate signal plates for capacitors Cs, Cr, Csf, Crf. The segmentation of the electrode is provided by initially screening or depositing a layer of conductive material on the quartz disc in a basic circular pattern with the associated terminals. A laser is then used to burn through the conductive pattern and separate the electrode into electrically continuous areas to form the plates in the shapes illustrated. These capacitor plates, when they oppose the common plate formed by the electrode 94, make up the four capacitors of the transducer. Each of the four are connected to their respective transducer terminals 46, 50, 52, 54 by conductive paths. For example, the conductive paths 96, 98, 100, and 102 connect terminals 46, 50, 52, and 54 to the segments labelled Crf, Csf, Cs, and Cr, respectively. The terminal lead 48 is electrically continuous with a conductive path 104 which surrounds each segment and separates each plate from the others. The conductive path 104 which is insulated from the capacitor plates comprises the internal ground shield and prevents self-interference between the segments by intercepting radiations from the adjacent plates and shunting them to ground.

Figure 9:
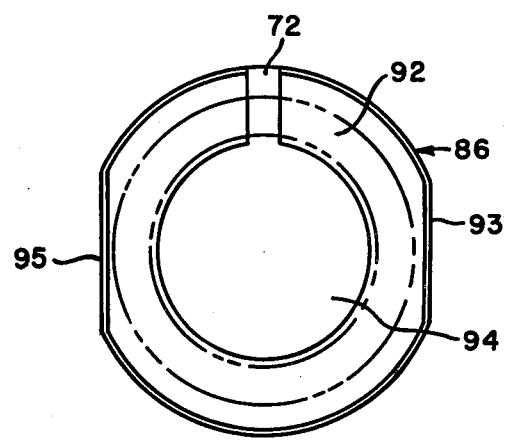
FIG. 9 is a bottom view of the quartz capacitive transducer illustrated in FIGS. 7 and 8, with the bottom quartz disc removed.

The cutout 97 is clearly shown in FIG. 8 and provides for a facile connector to the common plate 94 and terminal 72 illustrated in FIG 9.

With the configuration shown, each signal plate is separated from the common plate by a gap and forms a capacitor therewith. The pressure versus capacitance characteristic for each signal capacitance is determined by the area of the signal plate, its shape, and its positioning with respect to the center of the quartz disc. The area of a signal plate determines the initial capacitance at a reference pressure and its shape and positioning determine the dynamic characteristic of the capacitor. Since the quartz disc deflects a maximum distance at the center and proportionally less farther away from the center, a greater change in capacitance will be genererated from those conductive areas which are most centrally located.

Generally, the segmented signal plates of electrode 90 are formed by two regions. The first is a central inner region which is generally circular in shape and the second is an outer region which is generally ring shaped. The two pressure sensitive capacitors Csf and Cs, because of the greater deflection of the quartz diaphragms toward the center, occupy the central region. Each of the pressure sensitive capacitors comprise relatively half of the central region except for the exact center where pressure sensitive capacitor Cs includes a semicircular portion 106.

The ring of the outer region is generally divided into two substantially equal area crescent-shaped portions which are the signal plates for reference capacitors Crf and Cr. Since the outer area is less deformable with pressure than the central region, the reference capacitors are relatively insensitive to pressure as compared to the pressure sensitive capacitors Csf and Cs.

Figure 10:
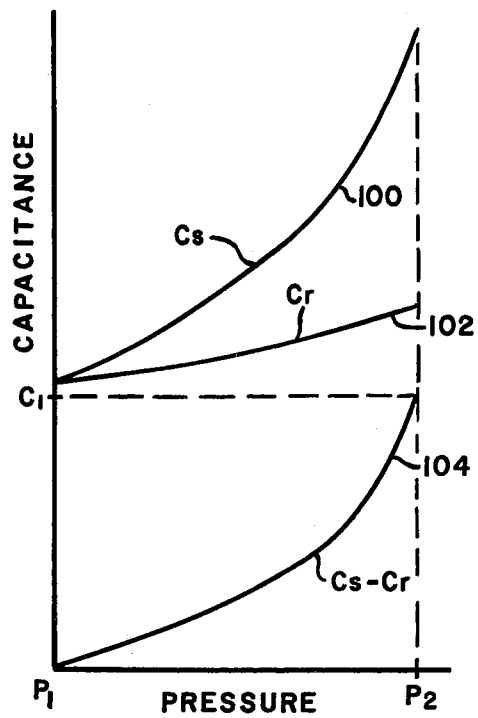
FIG. 10 is a graphical representation of the change in capacitance as a function of pressure for the capacitances Cs and Cr of the transducer illustrated in FIGS. 7, 8, and 9.
Figure 11:
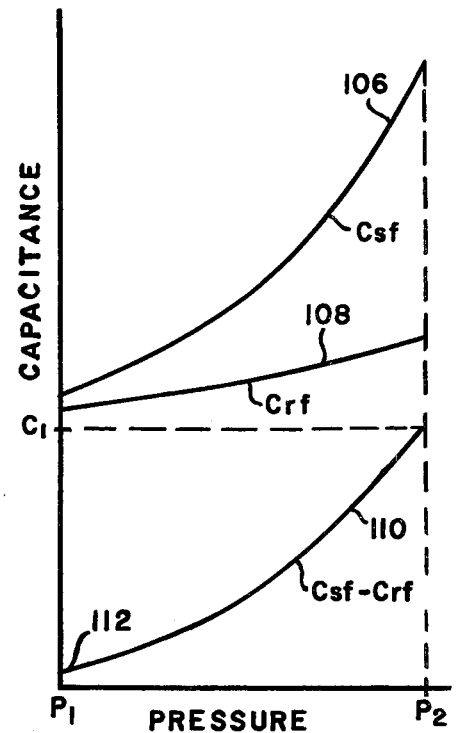
FIG. 11 is a graphical representation of the change in capacitance as a function of pressure for the capacitances Csf and Csr of the pressure transducer illustrated in FIGS. 7, 8, and 9.

How the actual capacitance of each of the capacitors Cs, Csf, Cr, and Cfr varies as a function of pressure is illustrated in FIGS. 10 and 11. It is seen that the pressure sensitive capacitors Cs, Csf have capacitance characteristic curves 100, 106 which increase as a function of pressure while the reference capacitors Cr, Csr have relatively insensitive pressure characteristic curves 102, 108. The reference capacitor curves when subtracted from the pressure sensitive capacitor curves generate curves 104, 110. The two curves 104, 110 form the numerator and denominator, respectively, of the desired transfer function when the transducer 26 is connected in the measuring system shown in FIG. 1.

As was previously noted in Sell et al. the transfer function of the pressure measuring system in a steady state condition is equivalent to:

$$N = \frac{Cs - Cr}{Csf - Crf} N\text{max}$$

For the desired compression of digital numbers at the lower pressure values of the system, N as a function of pressure should vary as the curve 21 shown in FIG. 2. From inspection dN/dP is larger at the low end of the scale and becomes smaller with increasing pressure. Therefore, proportionally more of the digital numbers are available for pressure resolution at the low end of the scale. The initial difference (point 112) of FIG. 11 between the feedback capacitors Csf, Crf sets the maximum resolution of the system as it represents the smallest increment in feedback current. The feedback increments thereafter become larger with increasing pressure according to the curve 110.

However, to obtain the increasing curve 21 for the transfer function, it is necessary to have the numerator Cs–Cr increase faster for increasing pressures than the denominator Csf–Crf. This is accomplished by the curve 100 representative of Cs increasing faster for increasing pressures than curve 106 representative of Csf. Returning to FIG. 8 for a moment, it is the semicircular portion 106 of Cs that causes this action because of its extra area located exactly at the center of maximum deflection for the quartz disc. This effect is enhanced because of the cutout portion of Csf into which portion 106 protrudes. The radius of the central portion 106 can be varied to control this change.

Additionally, at manufacture, Cs and Csf should be substantially equivalent and Cr slightly larger than Crf. These values can be produced by changing the radius of the cut separating the individual plates on quartz disc 88 and the arcuate extent of each.

After assembly, the reference capacitor Cr and Crf can be trimmed by laser through the ground shield windows 80, 82 to provide the desired curve 21 in FIG. 2. At P1, Cr will be trimmed such that Cs=Cr thereby giving the zero point for the system. At P2, Crf is trimmed such that Cs-Cr=Csf-Crf thereby providing the transfer function with the value of 1 at C1 so that a full scale pressure of P2 is represented by the maximum digital number, Nmax.

While the preferred embodiment of the invention has been shown and described, it will be obvious to those skilled in the art that various modifications and variations may be made thereto without departing from the spirit and scope of the invention as hereinafter defined in the appended claims.

What is claimed is:

1. A capacitive pressure transducer comprising:
   a first substrate of insulative material;
   a second substrate of insulative material;
   at least one of said substrates being flexible and deforming in response to a pressure change;
   a first signal plate of electrically conductive material formed on a surface of said first substrate;
   a second signal plate of electrically conductive material formed on said first substrate surface;
   a third signal plate of electrically conductive material formed on said first substrate surface;
   a fourth signal plate of electrically conductive material formed on said first substrate surface;
   a fifth common plate of electrically conductive material formed on a surface of said second substrate;
   said first and second substrates positioned from each other such that a gap exits between said plates on said first and second surfaces wherein first, second, third, and fourth capacitors are formed between said first, second, third, and fourth plates and said fifth plate, respectively, said fifth plate serving as a common plate for combining excitation signals input to said signal plates into a single signal; and
   wherein said signal plates are formed on said first substrate and said common plate is formed on said second substrate such that the capacitance versus pressure characteristics for said first, second, third, and fourth capacitors have a predetermined relationship which does not vary because of the production variables of the transducer.

2. A capacitive pressure transducer as described in claim 1, wherein:
   at least one of said first and second substrates is composed of quartz.

3. A capacitive pressure transducer as described in Claim 2, wherein:
   said gap between the first and second substrates is sealed and referenced to a predetermined pressure.

4. A capacitive transducer as described in claim 1, wherein:
   said first capacitor is pressure sensitive and varies as a function of movements of said at least one flexible substrate.

5. A capacitive transducer as described in claim 4 wherein:
   said second capacitor is pressure sensitive and varies as a function of movements of said at least one flexible substrate.

6. A capacitive transducer as described in claim 5, wherein: said third capacitor is relatively pressure insensitive.

7. A capacitive transducer as described in claim 6, wherein: said fourth capacitor is relatively pressure insensitive.

8. A capacitive transducer as described in claim 7, wherein:
   said first and second plates are disposed in a relatively flexible area of said flexible substrate.

9. A capacitive transducer as described in claim 8, wherein:
   said third and fourth plates are disposed in a relatively inflexible area of said flexible substrate.

10. A capacitive transducer as described in claim 7, wherein:
    said first and second substrates are disc shaped and have circular faces opposing each other; and said first and second plates are disposed in a circular central region of the first substrate disc.

11. A capacitive transducer as described in claim 10, wherein:
    said third and fourth plates are disposed around said central region in a ring-shaped peripheral region of the first substrate disc.

12. A quartz capacitive transducer for the measurement of pressure having a first substrate of quartz and a second substrate of quartz separated by a gap wherein at least one of said substrates is flexible with respect to pressure and having conductive areas forming capacitor plates disposed on each of the substrates, said transducer characterized by:
    at least one common plate disposed on one of the substrates and four signal plates disposed on the other substrate thereby forming capacitors therebetween, wherein said common plate is adapted to combine variations in signals applied to said plates caused by the capacitance variations of said capacitors due to pressure, and;
    wherein said signal plates are formed on said one substrate and said common plate is formed on said other substrate such that the capacitance versus pressure characteristics for said capacitors have a predetermined relationship which does not vary because of the production variables of the transducer.

13. A quartz capacitive transducer as defined in claim 12 which further includes:
    a conductive ground shield, electrically connected to ground, disposed on said other substrate between said signal plates and insulatively separated from said signal plates.

14. A pressure transducer comprising: a first quartz disc having a deformation characteristic substantially invariable with temperature;
    a circular common plate disposed in the center of said first disc and formed of a conductive material;
    means for electrically connecting said common plate to an output terminal;
    a second quartz disc having a deformation characteristic substantially invariable with temperature;
    four signal plates disposed on said second disc and formed of conductive material;
    means for electrically connecting said signal plates to a plurality of input signal terminals;

an annular frit separating said first and second quartz discs and providing a chamber for a reference pressure;

said first and second discs deflecting with respect to changes in pressure such that the capacitance between at least two of the signal plates and said common plate varies;

means for inputting excitation signals to said input signal terminals whereby the output signal from said output terminal is the algebraic sum of the excitation signals modulated by the change in capacitance of the plurality of capacitors formed between said signal plates and said common plate; and wherein said signal plates are formed on said second disc and said common plate is formed on said first disc such that the capacitance versus pressure characteristics for said at least two capacitors have a predetermined relationship which does not vary because of the production variables of the transducer.

* * * * *